Patented Sept. 15, 1953

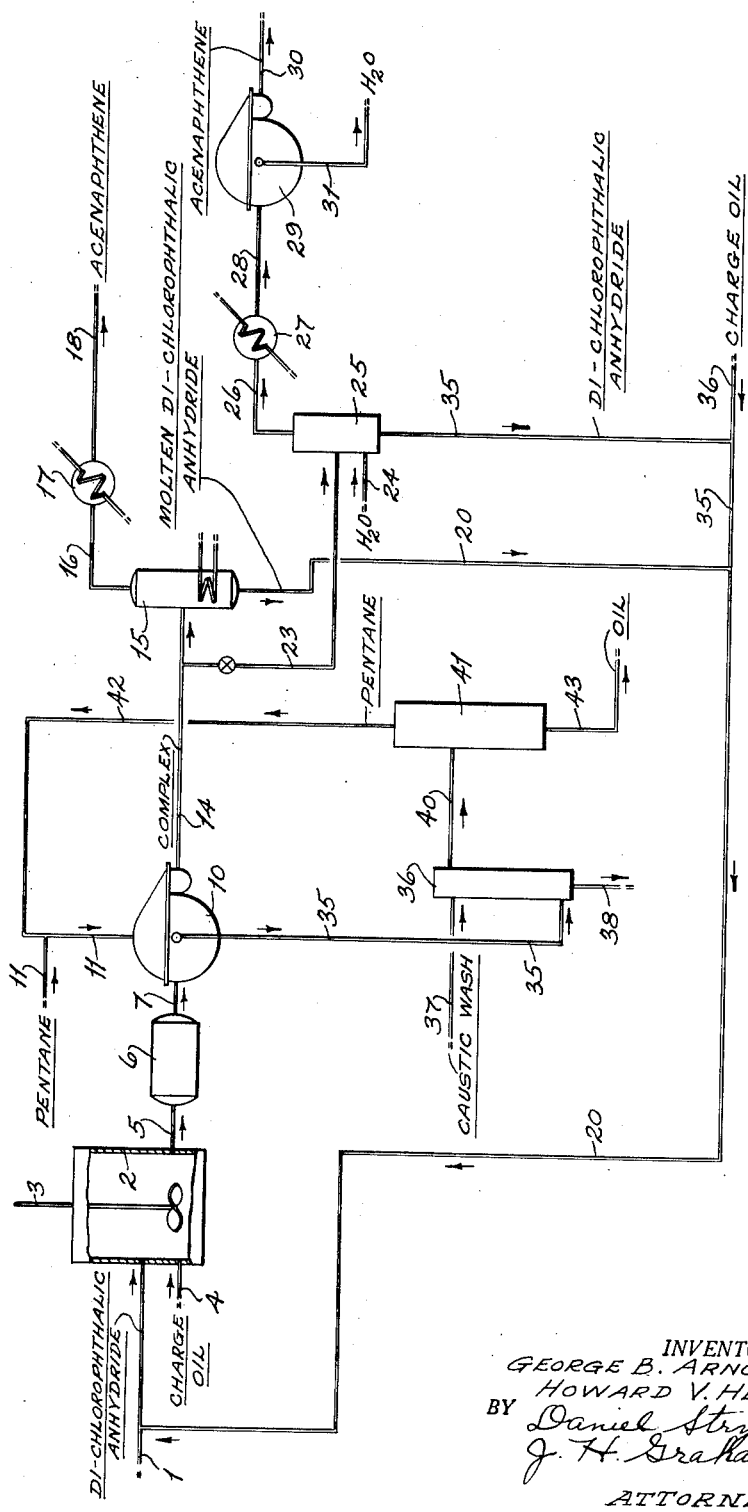

2,652,438

UNITED STATES PATENT OFFICE 2,652,438

PROCESS FOR SEPARATING ACENAPHTHENE

George B. Arnold, Glenham, and Howard V. Hess, Beacon, N. Y., assignors to The Texas Company, New York, N. Y., a corporation of Delaware Application February 23, 1950, Serial No. 145,638

6 Claims. (Cl. 260—674)

This invention relates to a process for separating acenaphthene from mixtures of other organic compounds, and particularly from naphthalene homologs and alkylated mono-cyclic aromatics of similar boiling point.

In accordance with the process of this invention, acenaphthene, homologs and substituted derivatives thereof are separated from aliphatic, naphthenic, mono-cyclic, aromatic heterocyclic and naphthalene compounds by formation of solid complexes of the acenaphthene compounds with dihalophthalic anhydride. Crystalline complexes comprising mol for mol quantities of acenaphthene and dihalophthalic anhydride are formed on contact of dihalophthalic anhydride and acenaphthene. Since the complex is substantially insoluble in hydrocarbons at normal room temperature, it is readily separated from the mixture of organic compounds with which the acenaphthene was associated. After separation of the complex, acenaphthene is recovered therefrom by heating the complex or by treating the complex with aqueous caustic solution. Separation of the complex from the mixture of organic compounds is advantageously effected at a temperature below 150° F. and ordinarily at a temperature between 50 and 125° F. at which temperatures the complex is substantially insoluble in organic compounds. Heat decomposition of the complex into its components is effected at a temperature above 200° F. and ordinarily at a temperature between 250 and 600° F. Decomposition of the complex with alkaline solution is ordinarily effected with dilute solution at temperatures between 70 and 150° F.

The process of the subject invention is particularly useful in separating acenaphthene from naphthalene and its homologs and from alkylated mono-cyclic aromatic compounds which possess boiling points similar to that of acenaphthene. Acenaphthene has long been used by industry as a starting material for the manufacture of a number of commercial dyes. Recently, it has found application in the production of resins, insecticides, fungicides and pharmaceuticals. Acenaphthene is found in coal tar distillates, tars from carbon black production and petroleum fractions produced in drastic cracking and coking. In these various sources, acenaphthene is found associated with a large number of compounds of similar chemical properties and boiling point, such as naphthalene homologs and alkylated mono-cyclic compounds from which it is very difficult to separate the acenaphthene. The process of this invention provides a simple procedure for effecting isolation of acenaphthene from the aforementioned compounds. It is reasonable to expect that the cost of acenaphthene will be materially reduced by the application of the process in this invention to its manufacture.

The dihalophthalic anhydrides are specific complexing agents for acenaphthene, its homologs, and substituted derivatives. Dichlorophthalic anhydride, dibromophthalic anhydride, diiodophthalic anhydride and difluorophthalic anhydride or mixtures thereof may be employed as the complexing agent in the process of this invention. Dichlorophthalic anhydride is ordinarily employed since it is available commercially at the lowest cost. In further description of this invention, dichlorophthalic anhydride will be employed to exemplify the invention.

The process of this invention is applicable to the separation of acenaphthene homologs and substituted acenaphthene compounds as well as to the isolation of acenaphthene itself. For example, alpha-methyl and beta-ethyl acenaphthene form complexes with dihalophthalic anhydride; substituted acenaphthene compounds, such as 1-chloro-2-nitro acenaphthene and acenaphthene quinone also form solid complexes with dihalophthalic anhydride.

The separation of acenaphthene compounds from mixtures wherein they are dissolved is effected by a simple procedure involving contacting the mixture with dihalophthalic anhydride, separation of the formed complex and decomposition of the complex into its components.

The contacting step is effected with thorough mixing of the complexing agent and the mixture containing acenaphthene compounds. A preferred method of insuring thorough contacting of the complexing agent with the acenaphthene compounds is to contact organic mixture with complexing agent at a temperature above 300° F. and preferably at a temperature between 325 and 400° F.; at these temperatures the complexing agent is soluble in most hydrocarbon mixtures. Thorough mixing and contacting of the complexing agent with the acenaphthene compounds is efficiently realized by dissolving the complexing agent in the hydrocarbon mixture. Upon cooling the mixture containing dissolved complexing agent to a temperature between 50 and 150° F., a complex of acenaphthene and dichlorophthalic anhydride separates out as a golden yellow solid.

It is also feasible to effect complex formation by slurrying solid dichlorophthalic anhydride with thorough agitation in an acenaphthene-containing mixture at normal room temperature. In such instances, longer contact time and more vigorous agitation is required in order to effect the same degree of separation that is effected by the procedure involving solution of the complexing agent at elevated temperature.

A third alternative involves liquid-liquid contact and comprises contacting a saturated solution of the complexing agent in a solvent, such as acetone, with the acenaphthene-containing mixture. A drawback attendant on the use of the liquid-liquid type system is that presence of the solvent introduces a third component into the system whose recovery necessitates additional treating steps.

The complex is readily separated from the mixture of organic compounds. Filtration, decantation or centrifugal separators may be used to effect removal of solid complex from the treated mixture. Filtration is the most commonly used method for effecting this separation. In large scale operations rotary filters, such as are employed in solvent dewaxing procedures employing methylethylketone-benzol solvent, provide a very efficient means for separating the complex from the treated mixture. Separation of the complex from the treated mixture is ordinarily effected at a temperature below about 150° F.; temperatures between about 50 and 125° F. have proven to be particularly effective for this separation.

After separation has been effected, it is advisable to wash the precipitate with a light hydrocarbon solvent in order to remove physically absorbed and adsorbed organic compounds from the complex. Pentane is an excellent wash solvent.

The separated complex is decomposed into its components by heating it to a temperature between 200 and 600° F. Several techniques may be employed to effect heat breaking of the complex. The preferred procedure involves straight heat stripping which comprises heating the complex to a temperature between about 250 and 600° F. whereby the complex is decomposed and the acenaphthene is obtained as a distillate. The dihalophthalic anhydride in molten form is recycled to the contacting zone. Temperatures between 350 and 600° F. are ordinarily used in straight heat stripping.

Another alternative involves contacting the complex with steam at a temperature between 300° F. and 600° F. whereby there is obtained a distillate comprising acenaphthene and water. Dihalophthalic anhydrides are not hydrolyzed at temperatures above about 300° F. so that anhydride is recovered from the steam distillation for recycling to the contacting zone. This procedure provides a neat method of breaking the complex, since both the acenaphthene and dichlorophthalic anhydride are recovered in form for further use.

A third procedure for decomposing the complex involves heating the complex in the presence of a solvent for acenaphthenes, such as naphtha, whereby the complex decomposes and there are formed two layers, one consisting of a complexing agent and the other of a solution of acenaphthenes in a solvent. A temperature of about 200° F. to 400° F. should be employed in order to decompose the complex with a solvent. Accordingly, if low boiling naphtha is used as a solvent, it may be necessary to use superatmospheric pressure in order to maintain the necessary decomposition temperature. The acenaphthenes can be separated from the naphtha solution by stripping.

The complex can also be decomposed by treating with dilute aqueous caustic solution. Temperatures between 50 and 200° F. can be employed for acenaphthene-dihalophthalic anhydride complex decomposition, but temperatures between 75 and 125° F. are preferred. Dilute caustic frees acenaphthene from the complex; there is formed a slurry of solid acenaphthene suspended in aqueous caustic containing dissolved dihalophthalic acid salt. Acenaphthene is substantially insoluble in dilute aqueous caustic solution and is readily separated therefrom.

In the accompanying drawing there is presented a flow diagram of a preferred procedure for effecting the process of the subject invention. Fro purposes of explanation, the process is applied to the separation of acenaphthene from an oil, such as neutral tar oil.

Through pipe 1 dichlorophthalic anhydride is introduced into a mixing vessel 2 fitted with stirring means represented by propeller 3. In the mixing vessel 2, the complexing agent is contacted with charge oil which is introduced therein through a line 4. The mixture vessel 2 is maintained at a temperature of about 350° F. at which temperature dichlorophthalic anhydride dissolves in the neutral tar oil from which acenaphthene compounds are to be separated.

After thorough mixing in the mixing vessel 2 the composite mixture of complexing agent and charge oil is introduced through a pipe 5 into a cooling vessel 6 wherein the treated mixture is cooled to a temperature below 150° F. and a solid complex of dichlorophthalic anhydride and acenaphthenes settles out. The composite mixture advantageously at a temperature of about 50 to 150° F. is introduced through a pipe 7 into a rotary filter 10, wherein the complex is separated from the treated mixture by filtration. Means are provided in the rotary filter for continual removal of the complex from the filter drum. Means are also provided for continual washing of the complex cake on the filter drum with a hydrocarbon solvent such as pentane, which is introduced into the rotary filter through a pipe 11. The complex is removed from the rotary filter 10 through a conduit 14 which is advantageously equipped with a screw type conveyor in order to facilitate movement of complex therethrough.

The complex is introduced into a vessel 15 wherein it is heated to a temperature between 350 and 600° F. At this temperature the complex decomposes and acenaphthene distills off as an overhead through the pipe 16 and passes through an exchanger 17 in which condensation of the acenaphthene is effected. The acenaphthene passes to storage or to further chemical reaction through a pipe 18.

Molten dichlorophthalic anhydride is withdrawn from the vessel 15 through a conduit 20 and is returned therethrough to the mixing vessel 2. In order to avoid crystallization of dichlorophthalic anhydride in the pipe 20, it is advisable to enclose pipe 20 in a steam jacket. Moreover, in practice the mixing vessel 2 and the vessel 15 are situated near one another so that the pipe 20 is of very short length.

An alternative method of decomposing the complex is also shown in the drawing. This alternative procedure involves steam distilling the complex at a temperature of about 300 to 400° F. If this alternative procedure is employed, the complex is introduced through pipes 14 and 23 into a distillation vessel 25 into which superheated steam is introduced through a pipe 24.

The complex is decomposed on steam distillation at a temperature between 300 and 400° F., and there is obtained a distillate comprising steam and acenaphthene, which is taken off overhead through a pipe 26. After condensation in the exchanger 27, the distillate is introduced into a filter 29 wherein solid acenaphthene is separated from water. Water is withdrawn from the filter 29 through a pipe 31 and acenaphthene is withdrawn from the filter 29 through a pipe 30.

Dichlorophthalic anhydride is withdrawn from the distillation vessel 25 through the pipe 35 and is recycled to the mixing vessel 2 through pipes 35 and 20. Charge oil can be introduced through a pipe 35 through a pipe 36 to act as a carrier for returning complexing agent to the mixing vessel 2 when decomposition of the complex is effected by steam distillation.

The filtrate obtained from filter 10 comprises neutral tar oil substantially free from acenaphthene compounds; it is withdrawn from the rotary filter 10 through a pipe 35 and is introduced into a wash tower 36. The wash liquor obtained by washing the complex with pentane is combined with the filtrate and flows into tower 36 through the pipe 35. Combined filtrate and pentane wash are contacted with dilute caustic, for example, 3 per cent sodium hydroxide in wash tower 36. The caustic is introduced into the tower 36 through a pipe 37. The caustic wash frees the oil of residual quantities of dichlorophthalic anhydride. The caustic wash is removed from the tower 36 through a pipe 38.

The washed oil is introduced through a pipe 40 into a stabilizer 41 wherein it is freed from pentane which is taken off overhead from the stabilizer 41 and is recycled through a pipe 42 to the rotary filter 10. The coal tar distillate freed of its content of acenaphthenes is removed from the stabilizer 41 through a pipe 43.

The following example illustrates the recovery of acenaphthenes from a naphthalene-rich aromatic fraction by the process of this invention.

A naphthalene-rich aromatic fraction from tar stripping comprising approximately 10 per cent acenaphthene and 10 per cent naphthalene was contacted with dichlorophthalic anhydride in the amount of 400 g. of aromatic fraction per 200 g. of dichlorophthalic anhydride. The entire reaction mixture was heated to 350° F. with agitation; on cooling to 55° F., there was obtained a precipitate comprising acenaphthene-dichlorophthalic anhydride complex and excess complexing agent. The precipitate was separated and was treated with caustic at a temperature about 80° F. whereby the complex was decomposed and there was obtained a slurry of solid acenaphthene in caustic solution. On filtration there was isolated 31.8 g. of acenaphthene which on recrystallization from alcohol had a melting point of 92.5° C. indicating an approximate purity of 100 per cent. The filtrate obtained on separation of complex and excess dichlorophthalic anhydride comprises acenaphthene-free aromatic fraction and pentane wash; after caustic washing of the filtrate, the pentane was stripped therefrom and there was obtained 273 g. of filtrate oil containing 1 weight per cent acenaphthene and 10 weight per cent naphthalene.

The foregoing detailed description and example illustrate a preferred method for effecting isolation of acenaphthene from crude mixtures.

It will be recognized that other dihalophthalic anhydrides may be employed and other procedures used for the decomposition of the complex into its components. Moreover, it is apparent that the process of the invention can be used either to isolate acenaphthene compounds from a crude mixture or to free a hydrocarbon fraction of acenaphthene compounds when the presence of such compounds is detrimental to the intended use of the hydrocarbon fraction.

In our co-pending application, S. #127,202, entitled A Process for Separating Polycyclic Aromatic Compounds from Organic Mixtures, which was filed on November 14, 1949, there is disclosed a process for separating polycyclic aromatic compounds in general from crude mixtures by employing tetrahalophthalic anhydride as the complexing agent. Acenaphthene compounds containing an acenaphthene nucleus are separated from crude mixtures together with other polycyclic aromatic compounds by the process disclosed in this co-pending application. The mixture of polycyclic aromatic compounds isolated from a crude mixture by complexing with tetrahalophthalic anhydride is a good source of acenaphthene and forms a preferred charge material in the process of this invention since acenaphthene is isolated therefrom by complex formation with dihalophthalic anhydride.

Obviously, many modifications and variations of the invention, as hereinbefore set forth, may be made without departing from the spirit and scope thereof, and therefore only such limitations should be imposed as are indicated in the appended claims.

We claim:

1. A process for recovering acenaphthene and homologs thereof from mixtures containing such compounds in association with aromatic compounds of similar boiling point which comprises contacting said mixture with dihalophthalic anhydride, forming a complex comprising said dihalophthalic anhydride and said acenaphthene compounds, separating said complex in solid form at a temperature below 150° F. and decomposing said complex by contact with steam at a temperature between 300 and 600° F.

2. A process according to claim 1 in which dichlorophthalic anhydride is employed as the complexing agent.

3. A process according to claim 1 in which contact of dihalophthalic anhydride with the acenaphthene-containing mixture is effected by dissolving dihalophthalic anhydride in the mixture at a temperature above 300° F. and thereafter cooling said mixture to a temperature below 150° F.

4. A process for recovering acenaphthene and homologs thereof from mixtures containing such compounds in association with aromatic compounds of similar boiling point which comprises contacting said mixture with dihalophthalic anhydride at a temperature above 300° F., cooling said mixture to a temperature below 150° F. whereby a solid complex consisting mainly of said dihalophthalic anhydride and said acenaphthene compounds is formed, separating said solid complex, decomposing said complex by contact with steam at a temperature between 300 and 600° F. into dihalophthalic anhydride and a steam distillate, recovering said acenaphthene compounds from said steam distillate and recycling said dihalophthalic anhydride to contact said mixture.

5. A process for recovering acenaphthene and homologs thereof from mixtures containing such compounds in association with aromatic compounds of similar boiling point which comprises contacting said mixture with dihalophthalic anhydride, forming a complex comprising said dihalophthalic anhydride and said acenaphthene compounds, separating said complex in solid form at a temperature below 150° F. and decomposing said complex by contact with dilute caustic at a temperature between 50 and 200° F.

6. A process according to claim 5 in which contact of dihalophthalic anhydride with the acenaphthene-containing mixture is effected by dissolving dihalophthalic anhydride in the mixture at a temperature above 300° F. and thereafter cooling said mixture to a temperature below 150° F.

GEORGE B. ARNOLD.
HOWARD V. HESS.

References Cited in the file of this patent

UNITED STATES PATENTS

| Number | Name | Date |
| --- | --- | --- |
| 2,347,228 | Winans | Apr. 25, 1944 |
| 2,440,688 | Insinger | May 4, 1948 |

OTHER REFERENCES

Pfeiffer et al., Berichte 55B, 413–29 (1922). Abstracted in Chemical Abstracts, vol. 16, 2483–4 (1922).